United States Patent Office 3,365,526
Patented Jan. 23, 1968

3,365,526
PREPARATION OF POLYURETHANE SPINNING SOLUTION AND FIBERS USING AROMATIC DIHYDROXY ALKYL ETHERS
Horst Wieden, Dormagen, Erwin Muller and Gunther Nischk, Leverkusen, and Wolfgang Rellensmann and Bela Von Falkai, Dormagen, Germany, assignors to Farbenfabriken Bayer Aktiengesellschaft, Leverkusen, Germany, a German corporation
No Drawing. Filed Feb. 19, 1964, Ser. No. 345,840
Claims priority, application Germany, Feb. 21, 1963, F 39,074
8 Claims. (Cl. 264—176)

ABSTRACT OF THE DISCLOSURE

Spinning solutions and fibers prepared from these solutions are prepared by reacting in the melt an hydroxyl polyester with an aromatic diisocyanate at a temperature less than about 100° C. and then reacting this NCO prepolymer at a temperature of at least about 50° C. in a polar solvent for polyacrylonitrile with a quantity of an aromatic dihydroxy alkyl ether such that the remaining excess of dissocyanate is from about 0.2 to 3 parts by weight calculated on 100 parts by weight of the polyester and cooling the solution to a temperature of 0° C. to about 20° C. for from about 4 to about 24 hours. The fibers are spun when a 25 percent solid content solution exhibits a viscosity of from about 50 poises at 20° C. to about 1,000 poises at 20° C.

This invention relates to the production of elastomeric polyurethane polymers suitable for the fabrication of filaments and fibers. More particularly, it relates to a method of producing such polymers.

Various processes have become known in recent years for spinning polyester-polyisocyanate or polyether-polyisocyanate addition products from solutions to form filaments or fibers. In such cases, linear or slightly branched polyesters or polyethers containing hydroxyl groups are, for example, reacted with aliphatic or aromatic diisocyanates in excess, so that first of all, initial adducts having free isocyanate groups are formed. Such initial adducts are then reacted in solution with amino alcohols, diamines, amino carboxylic acids, dihydrazides or hydrazine in at least equivalent quantity, calculated on the free isocyanate terminal groups. Solutions of high molecular weight are formed, and these can be processed by the various methods used in the spinning art to form elastomeric fibers or filaments. Since no further cross-linking reactions occur during the spinning process, such filaments or fibers are soluble in the normal polyurethane solvents.

Other processes are based on the fact that polyesters or polyethers containing hydroxyl groups are first of all reacted with an excess of diisocyanate. These initial adducts are then spun, with or without solvents, in spinning baths which contain bifunctional or polyfunctional amines reacting quickly with isocyanate groups. During the coagulation, a lengthening of the chain and cross-linking then takes place. Such elastic fibers must be subsequently heated for a certain time in order to produce good mechanical properties by completion of the reaction. Since it is cross-linked materials which are formed after this operation, such filaments or fibers are scarcely still soluble in the usual polyurethane solvents at high temperatures.

It is also known that cross-linked polyurethane elastomers, which are obtained, for example, by reacting polyesters and glycols with excess quantities of diisocyanates by heating in block form, are broken down to such an extent by subsequently relatively strong thermal treatment with polyacrylonitrile solvents such as dimethyl formamide, that spinnable soltuions are formed. However, it is difficult technically always to achieve the same degree of degradation and thus to obtain elastomeric filaments and fibers having constant mechanical properties.

It has also been known in U.S. Patent 3,016,364 to react phenylene dioxyethyl ethers with compounds containing active hydrogen atoms and organic polyisocyanates or NCO terminated prepolymers prepared from the above reactants to produce polymers particularly suitable for casting. This reaction is conducted in the melt.

It is therefore an object of this invention to provide an improved method of preparing polyurethane polymers. It is another object of this invention to provide an improved method of preparing spinning solutions of polyurethane polymers. It is still another object of this invention to provide an easily controlled reproducible method of obtaining a spinning solution of a particular polyurethane polymer. It is a further object of this invention to provide a method for preparing spinning solutions of polyurethane polymers wherein the order of addition of reactants and solvent is critical.

The foregoing objects and other which will become apparent from the following description are accomplished in accordance with the invention generally speaking by providing polyurethane polymers in solutions, by reacting in the melt an hydroxyl terminated linear polyester prepared by reacting a dihydric alcohol with a dicarboxylic acid with an excess of an aromatic diisocyanate at a temperature above 100° C. in a first step to prepare an NCO terminated prepolymer, reacting this prepolymer in the second step at a temperature above 50° C. in a polar solvent which is capable of dissolving polyacrylonitrile with a quantity of an aromatic dioxyalkyl ether such that the remaining excess of diisocyante based on 100 parts by weight of the polyester is from about 0.2 to about 3 parts by weight. This solution is permitted to stand until a viscosity suitable for spinning is reached, then it is spun by either the wet spinning or dry spinning method into suitable filaments or fibers. The solutions should be spun when a viscosity of from about 50 P/20° C. to about 1000 P/20° C. is reached, calculated for a 25% solid content solution.

Any suitable substantially linear polyesters containing hydroxyl groups may be used as a starting material such as those prepared by the condensation of dicarboxylic acids and dihydric alcohols. Any suitable dicarboxylic acid may be used, such as, for example, succinic acid, adipic acid, pimelic acid, methyladipic acid, glutaric acid, azelaic acid, sebacic acid, thiodibutyrc acid, sulphonyldibutyric acid, maleic acid, fumaric acid, phthalic acid, isophthalic acid, terephthalic acid, and the like. Any suitable dihydric alcohol may be used, such as, for example, ethylene glycol, diethylene glycol, propane-1,2-diol, butane-1,4-diol, hexane-1,6-diol, hexahydro-p-xylene glycol, xylylene glycol, 2,3-butanediol, 2,2-dimethylpropane-1,3-diol and the like, as well as their alkoxylation products such as those prepared by reacting alkylene oxides such as ethylene oxide, propylene oxide, butylene oxide with the glycols mentioned. In order more especially to obtain water-repellant polyurethane filaments or fibers, it is desirable to use those polyesters of which the acids and glycols contain a relatively large number of carbon atoms. It is preferred that the OH number is between about 20 and about 200, and most advantageously between about 35 and about 120. The acid numbers are generally below about 10, and advantageously between 0 and about 3.

According to one particular embodiment of the invention, polyesters are used which contain $\beta$, $\alpha$-unsaturated ether groups in the side position. Such polyesters are obtained if the aforesaid usual acid or alcohol components are partially replaced, for example, by allyloxysuccinic acid, glycerine monoallyl ether, trimethylol propane monoallyl ether or pentaerythritol dicrotonyl ether or their alkoxylation products. The amount of acid or alcohol components with $\beta$, $\alpha$-unsaturated ether groups in the side position should generally not exceed 25 mol % of the total quantity of acid or alcohol components.

These polyesters are reacted in the melt in a manner known per se with an excess of organic diisocyanates, preferably at temperatures above 80 to 100° C. With a 100% excess of diisocyanate, adducts are formed, the chains of which are generally scarcely lengthened and carry free isocyanate groups. It is of course, possible and frequently also very desirable to still further increase the proportion of the diisocyanate, so that as well as the polyester-diisocyanate adducts, there is still free diisocyanate in the melt. By this increase in the diisocyanate quantity, it is readily possible to vary within wide limits the E-modulus of the fibers forming during the spinning process.

Any suitable aromatic diisocyanates may be used such as, for example, 2,4-toluylene diisocyanate, 2,6-toluylene diisocyanate, and isomeric mixtures thereof; p-phenylene diisocyanate, naphthylene-1,5-diisocyanate, naphthylene-1,4- diisocyanate, diphenylmethane-4,4-diisocyanate, 3,3-dimethyl diphenylmethane-4,4-diisocyanate, 4,4-diisocyanatostilbene and 4,4-diisocyanatodibenzyl.

The isocyanate-modified polyesters with free NCO groups and produced in this way are then reacted at a temperature above about 50° C. in polar solvents which will dissolve polyacrylonitrile with such a quantity of a dihydroxyalkyl ether of phenols or naphthols that less than an equivalent quantity is used calculated on the NCO groups which are present. The excess of aromatic isocyanate which then remains should be from about 0.2 to about 3 parts by weight of diisocyanate, based on 100 parts of polyester.

Any suitable solvent which will dissolve polyacrylonitrile such as, for example, dimethyl formamide, dimethyl acetamide, dimethyl sulphoxide, dimethoxydimethyl acetamide and the like may be used. They must be free from those constituents which are able to react with diisocyanates; it is consequently desirable to use those solvents which have been distilled over high-boiling monoisocyanates or polyisocyanates.

Any suitable aromatic dioxyalkylether such as the dihydroxyalkylethers of phenols and naphthols may be used, such as, p-phenylene-di-($\beta$-hydroxyethyl ether), m-phenylene-di-($\beta$-hydroxyethyl ether), O-phenylene-di-($\beta$ - hydroxyethyl ether), p - diphenyl-di-($\beta$-hydroxyethyl ether), p-diphenyl-sulphone-di-($\beta$-hydroxyethyl ether), p-diphenylmethane-di-($\beta$-hydroxypropyl ether), 1,5-naphthylene-di-($\beta$-hydroxyethyl ether) and the like.

The glycol can be dissolved in the solvent to be used and be added to the isocyanate-modified polyester. However, the latter can also be dissolved beforehand and the glycol can be added in solid form or likewise in solution. The preferred procedure is for the glycol first of all to be dissolved in a part of the solvent which is to be used and for it then to be added to the isocyanate-modified polyester at temperatures above 50° C. The rapidly proceeding reaction makes it possible for additional solvent to be added until the required solid content is reached. This should generally be between 10 and 35%.

According to the invention, the resulting solution is stored for several hours at room temperature or below room temperature. In general, the storage time will be between 4 and 24 hours with a preferred temperature from 0–25° C.

If polyesters containing $\beta$, $\alpha$-unsaturated ether groups in the side position have been used within the scope of the present process, then peroxides or cobalt salts can be added to the solution prior to spinning. Highly cross-linked fibers or filaments are obtained which are no longer soluble in the usual polyurethane solvents. Suitable peroxides are, for example, benzoyl peroxide, lauroyl peroxide, dicumene peroxide, and cyclohexanol peroxide. The quantity used is generally 0.5–5%, calculated on the solid proportion of the solution. As cobalt salts, cobalt naphthenate, cobalt maleinate and cobalt octoate are mentioned as examples and these are generally used in quantities of 0.05–0.5%, based on the proportion of solid in the solution.

In accordance with another embodiment, it is possible for another 0.3–3 parts by weight of an aromatic diisocyanate, calculated on 100 parts by weight of polyester, to be added at temperatures below 50° C., before or after storage of the solution. A temperature between 10 and 25° C. is preferred. It is possible for this purpose to use the same diisocyanates as those which have been used in the preparation of the adducts.

It is possible to add compounds which cause a retardation or acceleration of the polyaddition reactions. With diisocyanates which react at particularly high speed, retarding agents such as acids or acid halides (adipic acid, hydrochloric acid, benzoyl chloride) can consequently be added in the first phase of the reaction between polyester and diisocyanate. By this means, the branching reaction by way of allophanate groups is retarded. In the subsequent conversion with the aromatic glycols, an acceleration with tertiary amines or heavy metal salts is frequently desirable.

The spinnable solutions produced as described have an excellent stability at low temperatures. Thus, they are for example, completely stable for six to eight weeks at temperatures in the region of 8–10° C. without it being possible to observe any decrease in the viscosity and thus degradation of the polymers. They are spun to form elastic filaments or fibers by the known methods used in the spinning industry, either "dry," i.e. at high temperature in air or inert gases or "wet," i.e., by injection into coagulation baths. Elastomeric fibers are obtained which have excellent mechanical properties, i.e. high tensile strength, low permanent elongation and high E-modulus. An additional advantage is that the individual capillaries, after coagulation, can easily be separated again without using auxiliary means, so that such fibers can readily be used as staple fibers.

The invention is further illustrated but not limited by the following examples in which parts are by weight unless otherwise specified.

EXAMPLE 1

*Production of the starting material*

About 146 parts of adipic acid are condensed with about 106 parts of hexane-1,6-diol and about 26 parts of 2,2-dimethyl propane-1,3-diol at about 190° C. in an inert gas atmosphere. When the thermometer of the reflux condenser indicates about 85° C., the internal pressure is slowly reduced to 12–15 mm. Hg. The condensation is continued at about 190° C. and 12–15 mm. Hg until the acid number is below 3.

About 250 parts of polyester (OH number 60) are dehydrated for one hour at 100° C./12 mm. Hg after addition of about 0.05 parts by volume of concentrated hydrochloric acid. About 87.5 parts of diphenylmethane-4,4'-diisocyanate are then introduced while stirring at about 130° C., the temperature rising to about 135° C. A temperature of 130–135° C. is maintained for about 11 minutes and then a solution of about 40 parts of p-($\beta,\beta'$-dihydroxyethoxy)-benzene in about 377.5 parts of dimethyl formamide is added. The reaction mixture is kept for about 14 minutes at from about 90 to about 95° C. Dilution is carried out with 377.5 parts of dimethyl formamide and a temperature between about 66 and about 72° C. is adjusted for about 15 minutes. The solution is then further diluted with about 755 parts of dimethyl formamide, the temperature falling to from about 45 to about 50° C. After about 30 minutes, the solution is cooled to from about 15 to about 20° C., 12-15 hours later, the spinning solution shows the suitable viscosity of 60 Poise/20° C. with a solid content of 20%.

EXAMPLE 2

About 250 parts of the polyester of Example 1 are dehydrated as explained therein and reacted for about 10 minutes at from about 135 to about 145° C. with about 62.5 parts of diphenylmethane-4,4'-diisocyanate. A solution of about 20 parts of p-($\beta,\beta'$-dihydroxyethoxy)-benzene in about 150 parts of dimethyl formamide is added, the temperature falling to from about 100 to about 110° C. After about 10 minutes and at the same temperature, the solution is diluted with a solution of about 0.8 parts of endoethylene piperazine in about 516 parts of dimethyl formamide and the temperature is kept for about 40 minutes at from about 50 to about 60° C. The solution is then brought to a solid content of 25% with 333 parts of dimethyl formamide, the temperature falling to about 40° C. One hour later, the temperature is lowered to from about 15 to about 20° C. After about 12-15 hours, the spinning solution has the suitable viscosity of 90 Poise /20° C.

EXAMPLE 3

About 250 parts of the polyester of Example 1 are dehydrated as explained therein and reacted for about 10 minutes at about 135 to 145° C. with about 88 parts of diphenylmethane-4,4'-diisocyanate. A solution of about 40 parts of p-($\beta,\beta'$-dihydroxyethoxy)-benzene in about 250 parts of dimethyl formamide is then added. After about 15 minutes at a temperature of about 100 to about 110° C., the reaction mixture is diluted with a solution of about 0.8 parts of endoethylene piperazine in about 506 parts of dimethyl formamide and a temperature of about 50 to about 60° C. is maintained for 25 minutes. About 378 parts of dimethyl formamide are then added at a temperature of about 40° C. About 30 minutes later, the solution is brought to a solid content of about 20% with about 378 parts of dimethyl formamide and immediately cooled to about 15 to about 20° C. About another 2 parts of diphenylmethane-4,4'-diisocyanate are added. After about 12-15 hours, the spinning solution has the suitable viscosity of 100 Poise/20°C.

EXAMPLE 4

About 250 parts of the polyester of Example 1 are dehydrated as explained therein, after adding about 0.05 parts by volume of concentrated hydrochloric acid, and reacted for about 10 minutes at about 130 to 135° C. with about 87 parts of diphenylmethane-4,4'-diisocyanate. A solution of about 40 parts of p-($\beta,\beta'$-dihydroxyethoxy)-benzene in about 377 parts of dimethyl formamide is added to the reaction mixture. After about 10 minutes at a temperature of about 90 to about 95° C., the reaction mixure is diluted with a solution of about 0.75 part of endoethylene piperazine in about 377 parts of dimethyl formamide and the temperature is kept for about 15 minutes at about 65 to about 70° C. The solution is now brought to a solid content of about 20% with about 754 parts of dimethyl formamide at a temperature of about 45° C. About 30 minutes later, the solution is cooled to about 10° C. After about 12-15 hours at this temperature, the suitable viscosity of the spinning solution of 60 Poise/ 20° C. is obtained.

EXAMPLE 5

About 250 parts of the polyester of Example 1 are dehydrated as explained therein after adding 0.05 part by volume of concentrated hydrochloric acid and reacted for about 10 minutes at about 130 to 135° C. with about 88 parts of 4,4'-diphenylmethane diisocyanate. A solution of about 35 parts of p-($\beta,\beta'$-dihydroxyethoxy)-benzene and about 9 parts of N,N-($\beta,\beta'$-dihydroxyethyl)-oleylamine in about 381 parts of dimethyl formamide is then added to the reaction mixture. After about 12 minutes at a temperature of about 90 to about 95° C., the reaction mixture is diluted with about 381 parts of dimethyl formamide and kept for about 20 minutes at about 65 to about 70° C. By means of about 762 parts of dimethyl formamide, the solution is now brought to a solid content of about 20%, the temperature being about 45° C. About 30 minutes later, the solution is cooled to about 10° C. About another 2 parts of diphenylmethane-4,4'-diisocyanate are then added and the solution is left standing for about 12 to about 15 hours at 10° C.

EXAMPLE 6

About 250 parts of the polyester of Example 1 are dehydrated as explained therein after adding about 0.05 part by volume of concentrated hydrochloric acid and reacted for about 10 minutes at about 130 to 140° C. with about 64.2 parts of diphenylmethane-4,4'-diisocyanate. A solution of about 27.5 parts of 1,5-di-($\beta$-hydroxyethoxy)-naphthalene in about 342 parts of dimethyl formamide is then added to the reaction mixture. After about 10 minutes at a temperature of about 90 to about 95° C. the reaction mixture is diluted with a solution of about 0.75 part of endoethylene piperazine in about 342 parts of dimethyl formamide and kept for about 15 minutes at about 65 to about 70° C. The solution is then brought to a solid content of about 20% by means of about 684 parts of dimethyl formamide, the temperature being about 50° C. About 30 minutes later, the solution is cooled to about 10° C. After about 12 to about 15 hours at this temperature, the spinning solution has the suitable viscosity of 70 Poise/20° C.

EXAMPLE 7

About 250 parts of the polyester of Example 1 are dehydrated as explained therein after adding about 0.05 part by volume of concentrated hydrochloric acid and reacted for about 10 minutes at about 130 to 135° C. with about 87 parts of diphenylmethane-4,4'-diisocyanate. A solution of about 50 parts of 1,5-di($\beta$-hydroxyethoxy)-naphthalene and about 387 parts of dimethyl formamide is added to the reaction mixture. After 10 minutes at about 95 to about 100° C., the reaction mixture is diluted with a solution of about 0.75 part of endoethylene piperazine in about 387 parts of dimethyl formamide and kept for about 15 minutes at about 65 to about 70° C. The solution is now brought to a solid content of about 20% with about 774 parts of dimethyl formamide, the temperature being about 50° C. About 30 minutes later, the solution is cooled to about 10° C. After about 12 to about 15 hours at this temperature, the spinning solution has the suitable viscosity of 80 Poise/20° C.

EXAMPLE 8

*Production of the starting material*

About 730 parts of adipic acid are condensed according to Example 1 with about 279 parts of ethylene glycol and about 76 parts of propane-1,2-diol to form a polyester with the OH number 61.5.

About 100 parts of this polyester are dehydrated according to Example 1 and reacted for about 10 minutes at about 135 to about 140° C. with about 35 parts of diphenylmethane-4,4'-diisocyanate. A solution of about 16 parts of p-($\beta,\beta'$-dihydroxyethoxy)-benzene in about 151 parts of dimethyl formamide is then added to the reaction mixture. After about 10 minutes at about 100 to about 110° C., the reaction mixture is diluted with about 151 parts of dimethyl formamide and kept for about 20 minutes at about 70 to about 75° C. The solution is then brought to a solid content of about 22%, by means of about 233 parts of dimethyl formamide, the temperature being about 50° C. About 30 minutes later, the solution is cooled to about 15 to about 20° C. Another part of diphenylmethane - 4,4' - diisocyanate is then added. After about 12 to about 15 hours at this temperature, the spinning solution has the suitable viscosity of 65 Poise/20° C.

EXAMPLE 9

About 100 parts of the polyester of Example 8 are dehydrated as in Example 1 and reacted for about 12 minutes at about 138 to about 145° C. with 24.5 parts of diphenylmethane-4,4'-diisocyanate. A solution of about 8 parts of p-($\beta,\beta'$-dihydroxyethoxy)-benzene in about 133 parts of dimethyl formamide is then added to the reaction mixture. After about ten minutes at about 100 to about 110° C., the reaction mixture is diluted with a solution of about 1.3 parts of endoethylene piperazine in about 133 parts of dimethyl formamide and kept for about 15 minutes at about 65 to about 70° C. The solution is then brought to a solid content of about 20% with about 266 parts of dimethyl formamide, the temperature being about 50° C. About 30 minutes later, the solution is cooled to about 10° C. After about 12 to about 15 hours at this temperature, the spinning solution has the required viscosity of 100 Poise/20° C.

The spinning solutions obtained in Examples 1–9 can be formed in excellent manner into elastomeric filaments by the wet spinning process at a spinning temperature of about 15 to about 60° C. and a ratio of stretch in the spinning funnel between 0.4 and 4 in an aqueous precipitation bath at a temperature of 20–75° C. To be mentioned as a particular characteristic when using a multi-aperture spinneret is the easy splitting of the rubber cable into separate capillaries.

The following Table 1 indicates for each of the spinning solutions which have been described a characteristic example of the spinning conditions which are used.

EXAMPLE 10

About 146 parts of adipic acid are condensed as in Example 1 with about 59 parts of hexa-1,6-diol, about 36 parts of 2,2-dimethyl propane-1,3-diol and about 33 parts of glycerine monoallyl ether to form a polyester with the OH number 49.

To about 250 parts of the polyester are added 0.05 part by volume of concentrated hydrochloric acid and, as in Example 1, are dehydrated and then reacted for about 10 minutes at about 125 to about 130° C. with about 81 parts of diphenylmethane-4,4'-diisocyanate. A solution of about 40 parts of p - ($\beta,\beta'$ - dihydroxyethoxy)-benzene in about 371 parts of dimethyl formamide is added to the reaction mixture. After about 10 minutes at about 90 to about 95° C., the reaction mixture is diluted with a solution of about 0.75 part of endoethylene piperazine in about 371 parts of dimethyl formamide and kept for about 15 minutes at about 65 to about 70° C. The solution is then brought to a solid content of about 20% with about 742 parts of dimethyl formamide, the temperature being about 45° C. About 30 minutes later, the solution is cooled to about 10° C. Another 2 parts of diphenylmethane-4,4'-diisocyanate are now added. After about 12 to about 15 hours at this temperature, the spinning solution has the suitable viscosity of 500 Poise/20° C. About 14.8 parts of dicumyl peroxide are added and, after filtration through a fore-pump, the solution is supplied to the dry spinning plant.

The spinning solution is conveyed by means of a spinning pump to the spinning head by being heated for a short time to the temperature indicated in Table 2. If the spinning conditions indicated in the table are chosen, strength values between 1.15 and 1.3 g./den. are produced.

TABLE 1

| Example | No. of apertures in spinneret | Diam. of spinneret apertures/μ | Thread withdrawal speed, m/min. | Ratio of funnel stretch | Temp. of spinning solution, ° C. | Temp. of aqueous precip. bath, ° C. | Constant content of dimethyl formamide in precip. bath, percent | Tensile strength, g./den. |
|---|---|---|---|---|---|---|---|---|
| 1 | 25 | 100 | 9 | 2 | 25 | 50 | 2 | 0.7 |
| 2 | 40 | 200 | 4 | 1.9 | 60 | 60 | 2 | 0.66 |
| 3 | 40 | 200 | 8.6 | 2.2 | 60 | 75 | 2 | 0.64 |
| 4 | 25 | 100 | 9 | 2 | 25 | 50 | 2 | 0.7 |
| 5 | 25 | 100 | 9 | 2 | 25 | 50 | 2 | 0.65 |
| 6 | 25 | 100 | 9 | 2 | 25 | 50 | 2 | 0.7 |
| 7 | 25 | 100 | 9 | 2 | 25 | 50 | 2 | 0.65 |
| 8 | 10 | 200 | 6.5 | 1.7 | 60 | 45 | 2 | 0.63 |
| 9 | 40 | 200 | 7 | 2 | 60 | 60 | 2 | 0.7 |
|   | 3,000 | 75 | 6 | 4 | 25 | 50 | 2 | 0.65 |

TABLE 2

| Example | No. of apertures in spinneret | Diam. of spinneret apertures/μ | Thread withdrawal speed, m./min. | Temp. of spinning solution, ° C. | Shaft temp., ° C. | Air temp., ° C. | Tensile strength, g./den. |
|---|---|---|---|---|---|---|---|
| 10 | 30 | 100 | 320 | 120 | 180 | 180 | 1.15 |
|   | 60 | 100 | 320 | 120 | 190 | 190 | 1.15 |
|   | 30 | 100 | 320 | 100 | 200 | 200 | 1.2 |
|   | 60 | 150 | 320 | 100 | 240 | 200 | 1.3 |
|   | 30 | 150 | 320 | 80 | 220 | 180 | 1.3 |
|   | 60 | 150 | 320 | 80 | 230 | 180 | 1.25 |

It is, of course, to be understood that any of the aromatic diisocyanates, polar solvents or dihydroxyalkyl ethers of phenols or naphthols set forth above may be used throughout the examples for those specifically defined therein. Further, any of the dihydric alcohols and dicarboxylic acids mentioned above may be used in the preparation of a suitable polyester which may be used in place of those found in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for the preparation of a spinning solution of a polyurethane polymer in an inert polar solvent which will dissolve polyacrylonitrile which comprises reacting in the melt at a temperature of at least about 100° C. an excess of an aromatic diisocyanate with a hydroxyl polyester prepared by reacting a dihydric alcohol with a dicarboxylic acid in a first step to prepare an NCO terminated prepolymer, reacting the said prepolymer at a temperature of at least about 50° C. and in a polar solvent which will dissolve polyacrylonitrile with a quantity of an aromatic dihydroxy alkyl ether such that the remaining excess of diisocyanate is from about 0.2 to about 3 parts by weight calculated on 100 parts by weight of said polyester and cooling the solution to a temperature of from about 0° C. to about 25° C. for from about 4 to about 24 hours.

2. The process of claim 1 wherein the polyester contains pendant β-α-unsaturated ether groups.

3. The process of claim 1 wherein the diisocyanate is 4,4′-diphenylmethane diisocyanate.

4. A process for the preparation of a spinning solution of a polyurethane polymer in accordance with claim 1 wherein the aromatic dihydroxy alkyl ether is a member selected from the group consisting of dihydroxy alkyl ethers of naphthols and dihydroxy alkyl ethers of phenols.

5. The process of claim 1 wherein the aromatic dihydroxy alkyl ether is a phenylene-di(β-oxyethylether).

6. The process of claim 1 wherein the aromatic dihydroxy alkyl ether is naphthylene di(β-oxyethylether).

7. A process for the preparation of polyurethane fibers which comprises reacting in the melt at a temperature of at least about 100° C. an excess of an aromatic diisocyanate with a hydroxyl polyester prepared by reacting a dihydric alcohol with a dicarboxylic acid in a first step to prepare an NCO terminated prepolymer, reacting said prepolymer at a temperature of at least 50° C. and in a polar solvent which will dissolve polyacrylonitrile with a quantity of an aromatic dihydroxy alkyl ether such that the remaining excess of diisocyanate is from about 0.2 to about 3 parts by weight calculated on about 100 parts by weight of said polyester, cooling the resulting solution to a temperature of from about 0° C. to about 25° C. for from about 4 to about 24 hours and spinning said solution when the viscosity of a 25 percent solid content solution is from about 50 poises at 20° C. to about 1,000 poises at 20° C.

8. The process of claim 7 wherein from about 0.3 to about 3 additional parts by weight of an aromatic diisocyanate calculated on 100 parts by weight of the polyester are added at a temperature less than 50° C. before cooling of said solution.

References Cited

UNITED STATES PATENTS

| | | | |
|---|---|---|---|
| 2,755,266 | 7/1956 | Brenschede | 260—32.6 |
| 2,861,972 | 11/1958 | Muller et al. | 260—75 |
| 2,929,804 | 3/1960 | Steuber | 260—77.5 |
| 3,001,971 | 9/1961 | Scott et al. | 260—47 |
| 3,012,992 | 12/1961 | Pigott et al. | 260—75 |
| 3,016,364 | 1/1962 | Muller | 260—47 |
| 3,078,257 | 2/1963 | Rinke et al. | 260—77.5 |
| 3,164,439 | 1/1965 | Muhlhausen et al. | 8—115.5 |
| 3,214,411 | 10/1965 | Saunders et al. | 260—75 |

FOREIGN PATENTS 798,209    7/1958    Great Britain.

OTHER REFERENCES

German Patentanmeldung, July 1956, F12902 IV b/39b, 3 pages relied upon, copy available in Scientific Library or class 260, Subclass 75 TNP.

DONALD E. CZAJA, *Primary Examiner.*

F. McKELVEY, *Assistant Examiner.*